United States Patent [19]

Enck

[11] Patent Number: 5,056,712
[45] Date of Patent: Oct. 15, 1991

[54] WATER HEATER CONTROLLER

[76] Inventor: Harry J. Enck, 922 Berkeley, Santa Monica, Calif. 90403

[21] Appl. No.: 595,789

[22] Filed: Oct. 9, 1990

Related U.S. Application Data

[63] Continuation of Ser. No. 449,363, Dec. 6, 1989, abandoned, which is a continuation of Ser. No. 292,524, Dec. 30, 1988, abandoned.

[51] Int. Cl.[5] .............................................. F23N 1/08
[52] U.S. Cl. ................................ 236/20 R; 236/25 R; 236/46 R; 236/47; 236/91 F
[58] Field of Search ............ 392/463; 236/9 R, 20 R, 236/25 R, 25 A, 23, 24, 46 R, 46 A, 46 F, 47, 91 R, 91 G, 91 F; 237/8 R, 19; 126/351; 219/330, 334; 364/557

[56] References Cited

U.S. PATENT DOCUMENTS

| | | | |
|---|---|---|---|
| 4,166,944 | 9/1979 | Scott | 236/47 |
| 4,381,075 | 4/1983 | Cargill et al. | 236/46 R |
| 4,522,333 | 6/1985 | Blau, Jr. et al. | 236/46 F |
| 4,620,667 | 11/1986 | Vandermeyden et al. | 236/46 R |
| 4,832,259 | 5/1989 | Vandermeyden | 236/20 R |
| 4,834,284 | 5/1989 | Vandermeyden | 236/46 R |
| 4,844,335 | 8/1989 | McKinley et al. | 236/46 R |

Primary Examiner—Harry B. Tanner

[57] ABSTRACT

A water heater controller including hot water supply temperature sensor, a return water temperature sensor, a cold water flow sensor, a recirculation loop ambient temperature sensor, and a processor and control unit for controlling the heating of water and the circulation of water. The processor and control unit controlling the water heater to permit the hot water supply temperature to decrease to within a first supply setback temperature range defined by a calculated first setback temperature during non-use of hot water that is within a historically indicated hot water use period, (2) selectively controlling the water heater and recirculation apparatus to permit the hot water supply temperature to decrease to within a second supply setback temperature range defined by a second setback temperature and to permit the return water temperature to decrease to within a return setback temperature range during hot water non-use that is within a historically indicated hot water non-use period, and (3) controlling the water heater and recirculating means during hot water use so that the hot water supply temperature is controlled relative to a predetermined maximum temperature. The first setback temperature is calculated relative to system heat loss and a minimum return water temperature.

60 Claims, 10 Drawing Sheets

WATER HEATER CONTROLLER

This is a continuation of U.S. Ser. No. 07/449,363, filed Dec. 6, 1989, abandoned, which was a continuation of U.S. Ser. No. 07/292,524, filed Dec. 30, 1988, abandoned.

BACKGROUND OF THE INVENTION

The disclosed invention generally relates to water heater controllers, and more specifically is directed to an adaptive water heater controller which controls water heater operation as a function of actual hot water usage.

Water heater systems commonly are configured to maintain the supply of hot water at a sufficiently high temperature to meet peak hot water usage, regardless of the actual usage. It has been long recognized that substantial amounts of energy are utilized in maintaining the high water temperatures necessary to meet peak usage. During periods of low or no usage, much of that energy is wasted.

Various techniques and controllers have been developed to reduce the amount of energy loss in hot water heater systems.

An example of a simple water heater controller is time clock which turns off the water heater system during preset time periods known to have no hot water demand, for example in a school at night. However, a large temperature drop in the hot water supply would require a long period of time to bring the hot water supply up to temperature, and the large temperature changes might required increased maintenance. Moreover, in parts of the country where freezing occurs, turning off water heater systems might cause damage due to freezing.

Other controllers determine a hot water supply temperature that is based on historical data as to amount of hot water used during specified time intervals or as to the amount of time the heater is on during specified time intervals. Such controllers, however, do not respond promptly to actual usage that departs from the historical data, and thus could maintain a supply temperature that is higher than needed for the actual usage occurring, or could maintain a supply temperature that is lower than needed for the actual usage occurring. Moreover, controllers which vary delivery temperature are believed to interfere with the built-in heater controls.

SUMMARY OF THE INVENTION

It would therefore be an advantage to provide a water heater controller that controls operation of water heater systems as a function of actual hot water usage.

Another advantage would be to provide a water heater controller that utilizes historical hot water usage data and responds promptly to actual usage levels.

Still another advantage would be to provide a water heater controller that permits hot water temperature to decrease when hot water is not being used and provides for adequate hot water upon demand.

A further advantage would be to provide a water heater controller which increases overall thermal efficiency by reducing heat loss and by increasing system efficiency.

The foregoing and other advantages are provided by the invention in a water heater controller that includes a processor and control unit responsive to hot water supply temperature, return water temperature, and hot water usage for (1) controlling the water heater to permit the hot water supply temperature to decrease to within a first supply setback temperature range defined by a first setback temperature during non-use of hot water that is within a historically indicated hot water use period, (2) selectively controlling the water heater and recirculation apparatus to permit the hot water supply temperature to decrease to within a second supply setback temperature range defined by a second setback temperature and to permit the return water temperature to decrease to within a return setback temperature range during hot water non-use that is within a historically indicated hot water non-use period, and (3) controlling the water heater and recirculating means during hot water use so that the hot water supply temperature is controlled relative to a predetermined maximum temperature.

In particular embodiments of the controller of the invention, the recirculating means includes a recirculating pump that is controlled by the control apparatus, or a diverter valve controlled by the control apparatus for diverting return water directly into the hot water supply line.

A further aspect of the invention is directed to controlling the heater pump of a heater so as to increase the transfer of heat to the water being heated and also to reduce heat loss in the heater.

BRIEF DESCRIPTION OF THE DRAWING

The advantages and features of the disclosed invention will readily be appreciated by persons skilled in the art from the following detailed description when read in conjunction with the drawing wherein.

DETAILED DESCRIPTION

Figure 1:
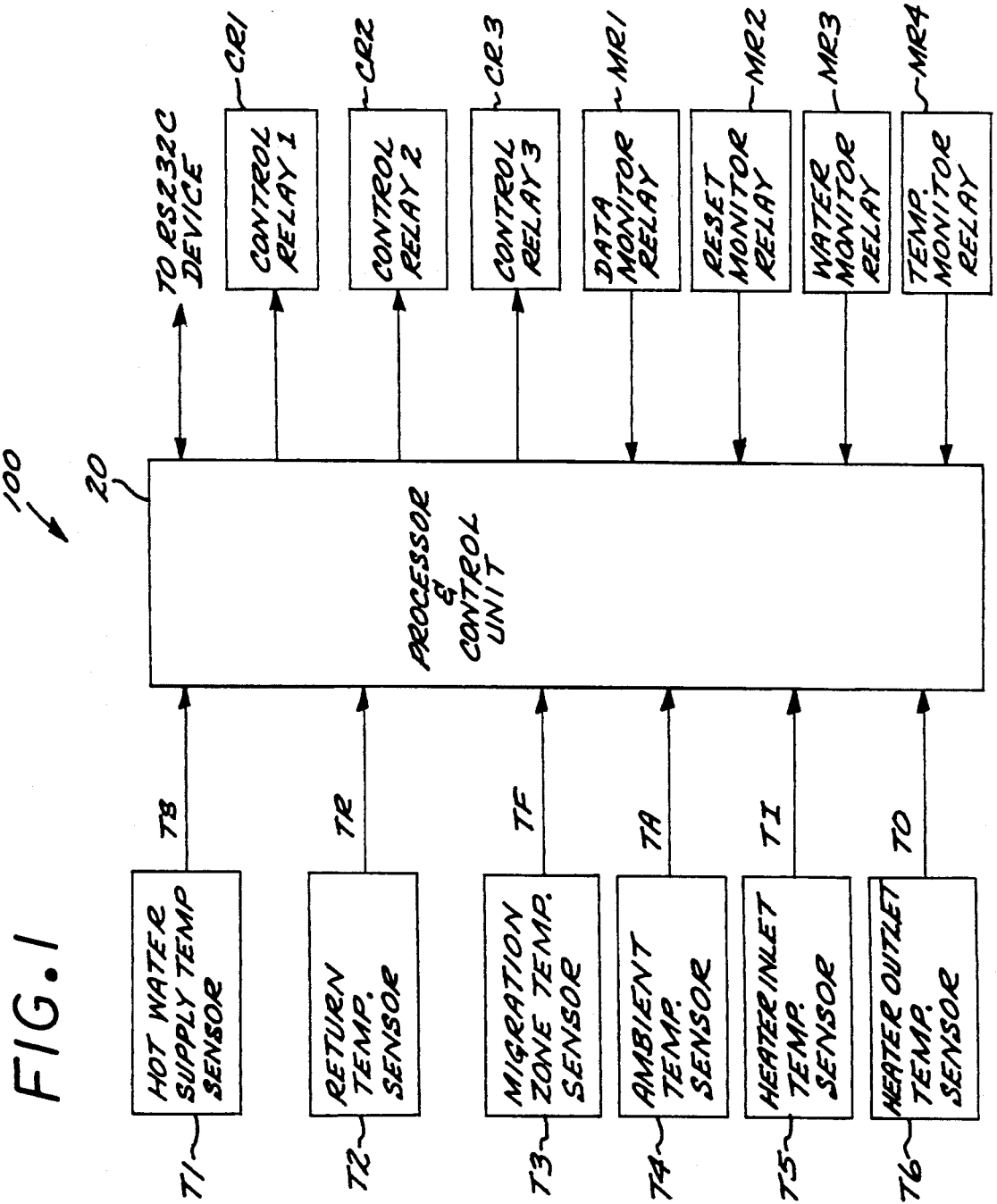
FIG. 1 is a block diagram of a water heater controller in accordance with the invention.

The disclosed invention is directed to a controller water heater systems, and for ease of explanation, the types and components of water heater systems will be described briefly.

Water heater systems generally can be classified into recirculating systems and non-recirculating systems. Recirculating systems are typically utilized in larger facilities such as apartment buildings, hotels, and office buildings, where hot water usage locations are remote from the source of the hot water. In a recirculating system, hot water is recirculated by a recirculating pump or by the effect of gravity on changes in density of the water in the system caused by temperature changes, so that hot water is readily available at the usage locations. Non-recirculating systems do not recirculate hot water, and are typically utilized in smaller facilities such as homes.

The overall structures of water heater systems can generally be categorized into the following types: (a) heater and separate storage tank systems, (b) instantaneous heater systems which do not include storage tanks, (c) tank type water heaters, such as those commonly installed in individual dwellings, and (d) heat exchanger systems wherein a water heater serves several functions such as thermal energy for space heating and for heating water via a heat exchanger. A heater and separate tank system typically includes a heater pump for recirculating water between the heater and tank while an instantaneous heater system often includes a heater pump for insuring sufficient water flow through in the heater. Tank type water heater systems do not include heater pumps.

Each of the different types of water heater systems typically includes a cold water supply line for receiving water to be heated, for example from a utility source or a well, and also includes a hot water supply line for supplying hot water to the hot water usage locations. Recirculating systems include a return line that provides the return water to the heater or to the separate storage tank, and depending on the system, the return water can be combined with the cold water prior to return to the heater or storage tank.

While the disclosed embodiments of the invention will be discussed primarily relative to recirculation type water heater systems, aspects of the invention are applicable to non-recirculating systems.

In the following detailed description and in the several figures of the drawing, like elements are identified with like reference numerals.

Referring now to FIG. 1, shown therein is a block diagram of a water heater controller 100 which includes a processor and control unit 20. The processor and control unit 20 can be of a standard microprocessor architecture configured and adapted to provide the control functions detailed further herein, and is further described herein relative to FIG. 2.

A plurality of temperature sensors T1 through T4 provide respective temperature data inputs to the processor and control unit 20 as to hot water supply temperature TS, return water temperature TR, cold water inlet migration zone temperature TF, and recirculation loop ambient temperature TA. For heater and separate tank systems, and for instantaneous heater systems, further temperature sensors T5 and T6 provide further respective temperature data inputs as to heater input water temperature TI and heater output water temperature TO.

The temperature sensor T1 is generally located on the hot water supply line as it exits from the water heater system, while the sensor T2 is generally located on the return line, for example close to the inlet of the recirculation pump.

The temperature sensor T3 is located externally on the portion of the cold water input line that comprises the migration zone. Generally, a migration zone is a region of plumbing into which hot water flows under natural or forced conditions. A cold water line entering a water heater or storage tank has a migration zone immediately adjacent to the device. At the cold water line connection, when no cold water is flowing as a result of no hot water usage, the density of water changes with temperature. Since the density of water decreases with increasing temperature, when no cold water is flowing, the cold water in the cold water line adjacent to the water heater or storage tank is replaced by less dense warmer water as a result of natural buoyancy forces created by the different densities of the water. As a result, the temperature of the migration zone increases under non-flow conditions. When cold water flows, the temperature of the migration zone decreases.

In a hot water system which has the return water entering the water heater or storage tank through an inlet in the cold water line, the migration zone is the region between the return water inlet to the cold water line and the water heater or storage tank. When cold water enters the system, it mixes with the recirculated water lowering the temperature of the fluid between the recirculating loop inlet and the water heater/storage tank. When no flow occurs, the recirculating loop warms the region between the recirculating loop inlet and the water heater storage tank.

The temperature sensor T4 is located at a convenient location for sensing an ambient temperature that is generally representative of the ambient temperatures to which the recirculation loop is exposed.

The heater input water temperature sensor T5, if appropriate, is located on the input water pipe to the heater which, for example, receives water from a storage tank, receives cold water, or receives cold water mixed with water from the storage tank.

The heater output water temperature sensor T6, if appropriate, is located on the outlet pipe for the heater which, for example, provides water to a storage tank or provides the hot water supply in the case of an instantaneous heater.

As described further herein, the temperature data TS, TR, TF, TA, and TI, TO if appropriate, are utilized by the water heater controller 100 in providing its control functions. If desired, further temperature sensors can be utilized to provide other temperature data that can be displayed as current temperature data or can be periodically stored for later readout or statistical processing.

A data monitor relay MR1 coupled to the processor and control unit 20 provides input information as to the on or off status of a selected element of the water heater system being controlled. The data monitor relay MR1 can be coupled, for example, to the gas valve of the water heater system being controlled. From the on/off data provided by the monitor relay MR, the cumulative time of burner operation can be tracked over a selected time period.

The water heater controller 100 can be installed by original equipment manufacturers (OEM) of water heater systems, and for such OEM installations, a reset monitor relay MR2, a water monitor relay MR3, and a water temperature monitor relay would be utilized. The reset monitor relay MR2 would be closed when the water heater system reset relay (not shown) is closed (i.e., system operating), and the water monitor relay MR3 would be closed while the heater water level or pressure is within operating limits. The water temperature monitor relay MR4 would be closed while the heated water temperature remains below a set maximum allowable limit.

The processor and control unit 20 controls the water heater system via control relays CR1, CR2. The control relay CR1 generally controls whether water is being heated, and more specifically controls the water heater system components that control the input of heat to the water and, depending on the particular installation and system, controls, for example, a gas valve, a steam valve, a solenoid valve, or electricity to a heater. Water is not heated when the control relay CR1 is off, and water can be heated when the control relay CR1 is on. The control relay CR2 controls the recirculation pump of the water heater system, if there is one, for example by controlling the electric power thereto.

The present invention further contemplates an electrically operated diverter valve controlled by the control relay CR2 for selectively diverting return water directly into the hot water supply line. With such installation, the recirculation pump would not be controlled. As another alternative, the control relay CR2 can be utilized to control the second heater of a staged water heater system wherein a first water heater receives the hot water output of a second water heater that typically heats the water to a lower temperature than the first heater. The control relay CR2 is not utilized in a non-staged, non-recirculating water heater system.

For heater with separate storage tank systems and for instantaneous heater systems, a control relay CR3 controls operation of the heater pump, for example by controlling the electric power thereto. Since the control relay CR3 should be on when water is being heated, it is turned on by the control relay CR1 being, and for purposes of the disclosed water heater controller 100 can also be turned on by the processor and control unit 20. In other words, CR1 is on if CR1 is on or if turned on by the processor and control unit 20. If CR1 is off and the processor and control unit 20 has not turned CR3 on, then CR3 is off.

Figure 2:
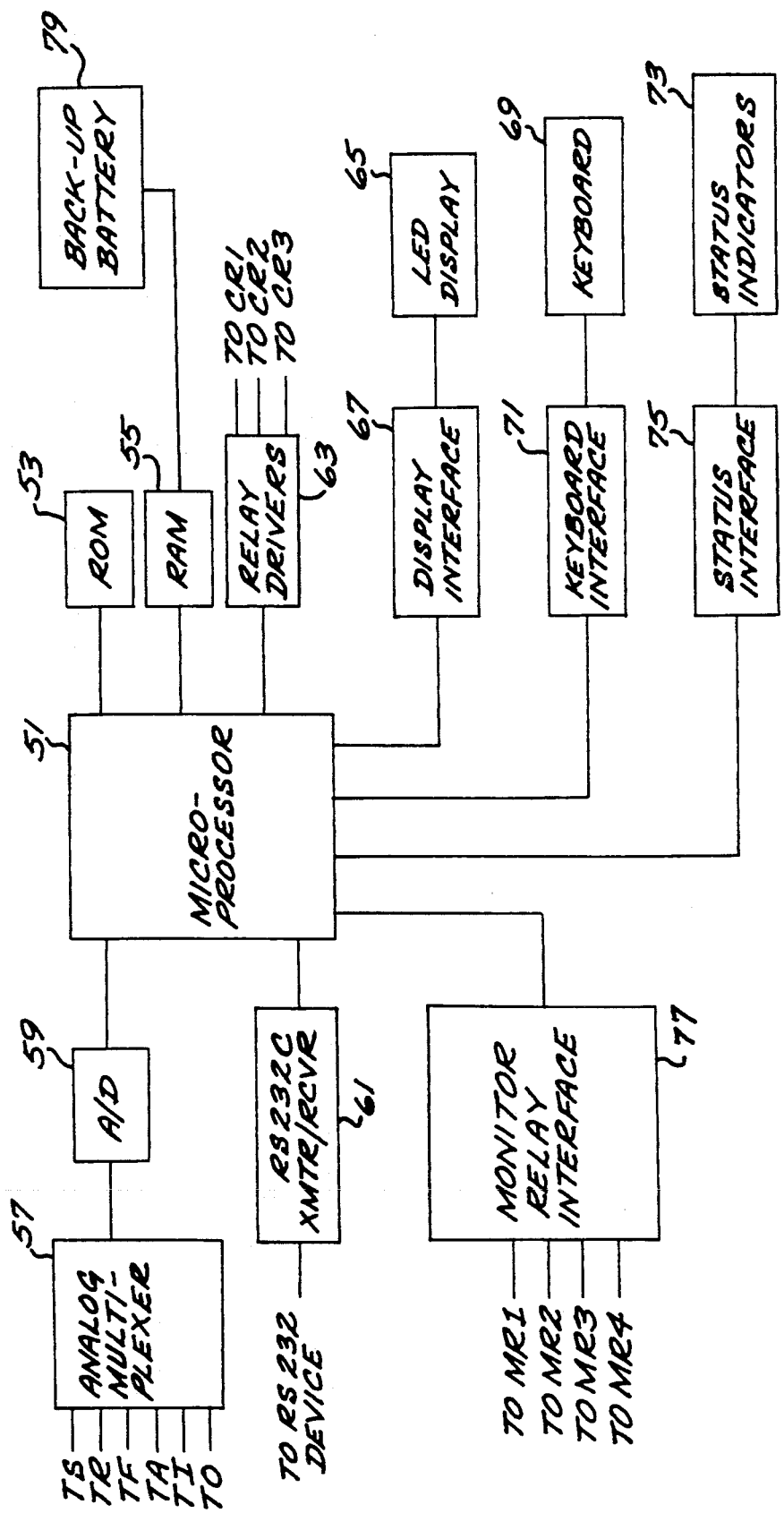
FIG. 2 is a generalized block diagram of the processor and control unit of the water heater controller system of FIG. 1.

Referring now to FIG. 2, shown therein is a generalized block diagram of the processor and control unit 20 which includes a microprocessor 51, and memory in form of a read-only memory 53 and a random access memory 55. An analog multiplexer 57 receives the analog outputs of the temperature sensors T1 through T6, and provides its multiplexed output to an analog-to-digital converter 59. The digital output of the analog-to-digital converter 59 is provided as an input to the microprocessor 51.

Communications capability is provided by a transmitter/receiver 61 which preferably complies with the RS232 interface standard. For example, a terminal could be coupled to the transmitter/receiver 61, directly or via a modem and telephone link, for purposes of retrieving stored data, for remotely changing program parameters, for monitoring operation, and so forth.

The processor and control unit 20 further includes relay drivers 63 for driving the control relays CR1, CR2, and the control relay CR3 if appropriate to the particular installation. Display information is provided by the microprocessor 51 to an LED display 65 via a display interface 67, and an input keyboard 69 is coupled to the microprocessor 51 via a keyboard interface 71. Status information is provided by the microprocessor 51 to status indicators via a status interface 75. A monitor relay interface 77 couples the data monitor relay MR1 to the microprocessor 51, together with monitor relays MR2, MR3, MR4 as appropriate for the particular installation.

For maintaining data in the event of power failure, a back-up battery is coupled to the random access memory 55.

Figure 3:
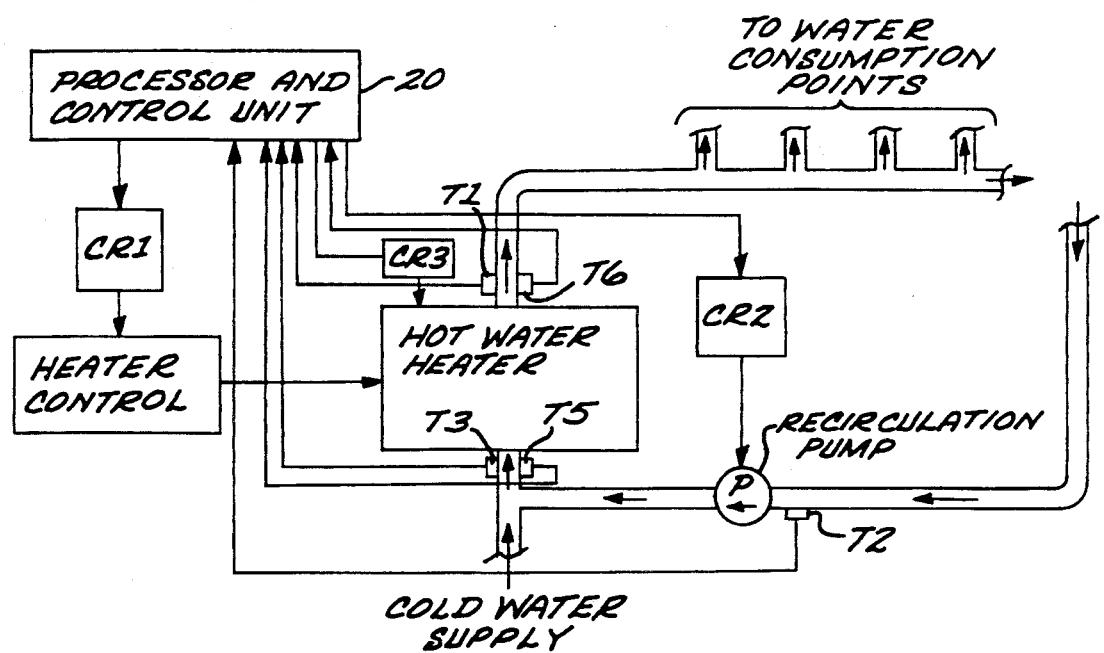
FIG. 3 schematically illustrates an example of the installation of the temperature sensors of the water heater controller of FIG. 1.

Referring now to FIG. 3, shown therein is an installation of the water heater controller 100 with a recirculating water heater system that includes an instantaneous type water heater (e.g., an instantaneous boiler) which provides hot water via a hot water supply line, and receives cold water via a cold water supply line. Return water is pumped by a recirculation pump into a return line which is connected to the cold water supply line.

The temperature sensor T1 is located on the hot water supply line near where it exits the heater, and the temperature sensor T2 is located close to the inlet to the recirculation pump. The temperature sensor T3 is located in the migration zone of the cold water line, for example at the junction of the return line with the cold water line. The temperature sensors T5 and T6 are located respectively at the inlet and outlet of the water heater.

The control relay CR1 is connected to the built-in heater control so as to disable heating of water when the control relay CR1 is off. When the control relay CR1 is on, the heater control operates normally. For example, the control relay CR1 could be utilized to interrupt electric power to the built-in heater control.

The control relay CR2 is connected to the recirculating pump so as to interrupt electrical power thereto when the control relay CR2 is off.

The control relay CR3 is connected to the heater pump (not shown) of the water heater if there is one, and functions to interrupt power to the heater pump when the control relay CR3 is off.

While the installation of FIG. 3 illustrates a water heater only, the same installation is applicable to a heater system having a separate hot water storage tank which provides the hot water supply via the supply line and which receives return water and cold water via the cold water supply line. Appropriate plumbing including a heater pump would circulate water between the storage tank and the water heater. In other words, the storage tank would be plumbed as shown for the water heater in FIG. 3, and the water heater would be connected to the storage tank via appropriate lines and a heater pump. The temperature sensors T5 and T6 would be located at the inlet to the heater and the outlet from the heater, respectively.

The installation of FIG. 3 is also applicable to a tank type water heater, in which case the temperature sensors T5 and T6, and the control relay CR3 would not be utilized.

Figure 4:
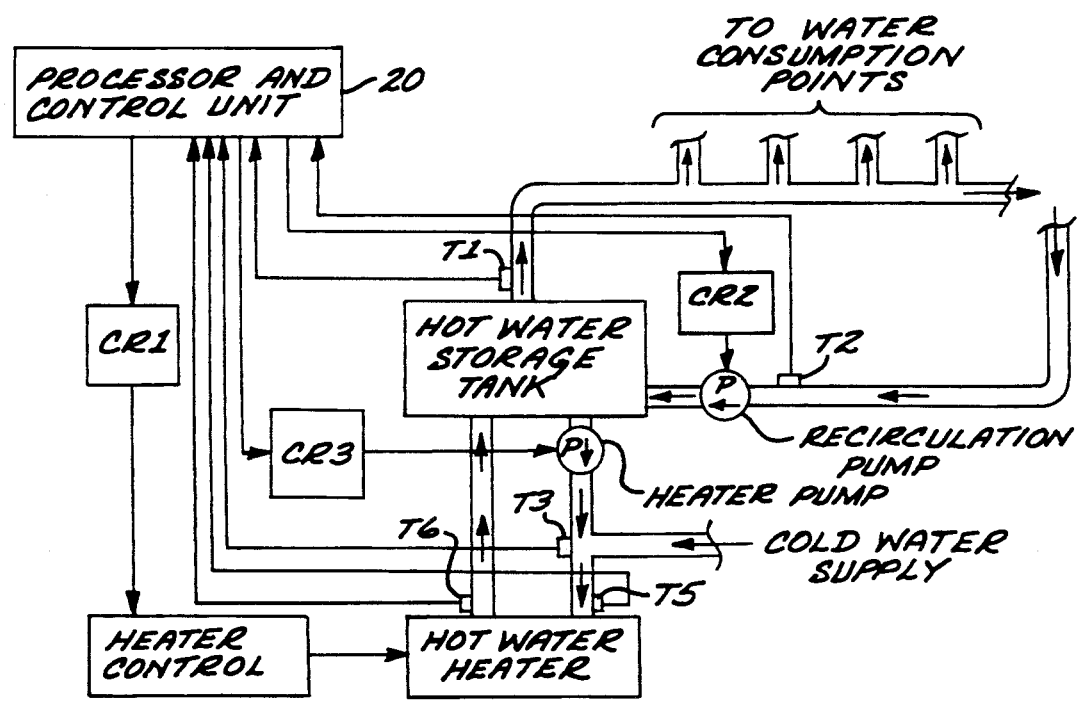
FIG. 4 schematically illustrates a further example of the installation of temperature sensors of the water heater controller of FIG. 1.

Referring now to FIG. 4, shown therein is an installation of the water heater controller 100 with a water heater system that includes a separate hot water storage tank that provides hot water via a hot water supply line, and receives return water via a recirculation pump. A water heater provides heated water to the storage tank, and receives cold water and storage tank water via a common storage tank output line.

The temperature sensor T1 is located on the hot water supply line close to where it exits the storage tank, and the temperature sensor T2 is close to the inlet of the recirculation pump. The temperature sensor T3 is located in the migration zone of the cold water input, for example at the junction of the return line with the cold water supply line. The heater input water temperature sensor T5 is located at the inlet to the water heater, while the heater output water temperature sensor T6 is located at the outlet to the water heater.

The control relays CR1 and CR2 are installed as described above relative to FIG. 3. The control relay CR3 is connected to the heater pump.

Figure 5:
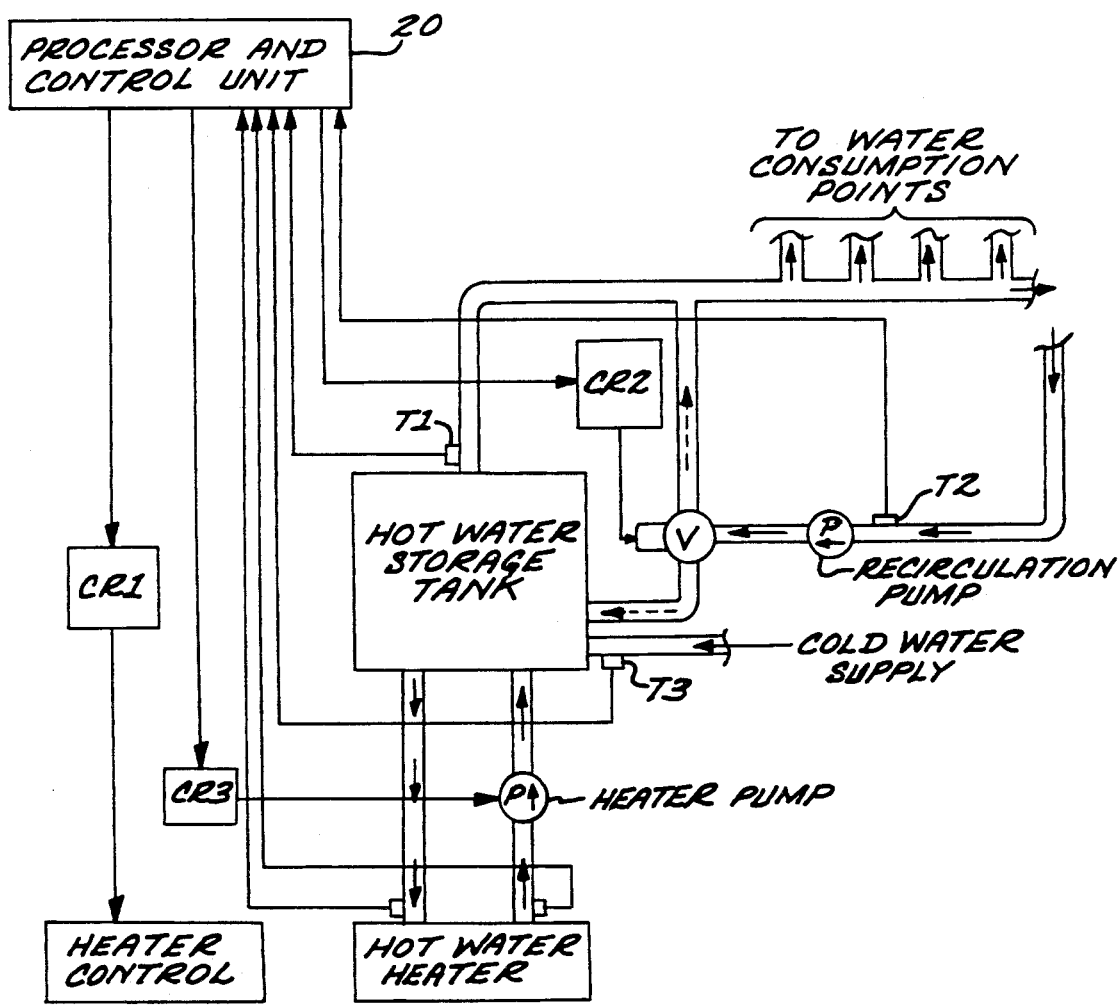
FIG. 5 schematically illustrates still another example of the installation of the temperature sensors of the water heater controller of FIG. 1.

Referring now to FIG. 5, shown therein is an installation of the water heater controller 100 with a heater and separate tank system which includes separate cold water and return lines into the storage tank. The installation of FIG. 5 also illustrates the use of an electrically operated diverter valve downstream of the return recirculation pump.

The temperature sensor T1 is located on the hot water supply line close to where it exits the storage tank, while the temperature sensor T2 is located close to the inlet of the recirculation pump. The temperature sensor T3 is located at the migration zone of the cold water supply line, for example adjacent to where it enters the storage tank. The heater input water temperature sensor T5 is located at the inlet to the water heater of the line from the storage tank. The heater output water temperature sensor T6 is located at the outlet of the water heater of the line to the storage tank.

The control relay CR1 controls the built-in heater control as discussed above relative to the installations of FIGS. 3 and 4, and the control relay CR2 controls the diverter valve. When the control relay CR2 is off, the diverter valve diverts return water directly into the hot water supply line, bypassing the storage tank. The control relay CR3 controls the heater pump that circulates water between the water heater and the storage tank.

It should be appreciated that the installation of FIG. 5 would be applicable to a heater only system wherein the water heater would be plumbed for separate cold water, return, and hot water supply lines as shown for the storage tank in FIG. 5. The temperature sensors T5, T6 and the control relay CR3 would be installed as shown in FIG. 3.

From the foregoing, the following generalized installation guidelines are evident:

A. The temperature sensor T1 (hot water supply temperature) is located on the hot water supply line close to where it exits the heater or storage tank.

B. The temperature sensor T2 return water temperature) is located on the return line, if there is one, upstream of the recirculation pump or close to the inlet thereto.

C. The temperature sensor T3 (migration zone temperature) is located at the hot water migration zone of the cold water supply to the water heater system; i.e., where under non-flow conditions, the cold water supply line is heated by stored hot water or return hot water.

D. The temperature sensor T4 (recirculation loop ambient temperature) is located so as to provide a sensed temperature that is generally representative of the ambient temperatures to which the recirculation loop is exposed.

E. The temperature sensor T5 (heater input water temperature) is located on the water inlet of an instantaneous heater or the heater of a heater/separate tank system.

F. The temperature sensor T6 (heater output water temperature) is located on the water outlet of an instantaneous heater or the heater of a heater/separate tank system.

The operation of the water heater controller 100 will now be described by way of illustrative example as to a recirculating water heater system having an instantaneous heater or a separate storage tank, and a recirculation pump or an electrically controlled diverter valve. The control relay CR1 controls power to the built-in water heater control, for example, by turning off a gas valve when turned off. The control relay CR2 controls power to the recirculation pump, and specifically interrupts electric power when turned off. The control relay CR3 controls the heater pump, and specifically interrupts electric power to the heater pump when turned off.

If an electrically operated diverter valve is installed, the recirculation pump is not controlled and the control relay CR2 controls the position of the valve. When the control relay CR2 is off, the diverter valve diverts the return water directly into the hot water supply line, thereby bypassing the heater or storage tank. When CR2 is on, the return water is directed to the water heater or storage tank.

The operation of the water heater controller 100 depends on whether hot water is being used, and by way of illustrative example hot water usage is determined by sensing the flow of cold water into the water heater system. In the following discussion, the use of hot water as determined by the controller is referred to hot water use, hot water demand, flow of cold water, flow, or other similar terms that are readily understood from context. In similar fashion, the condition of non-use of hot water is referred to as non-use, non-demand, non-flow of cold water, non-flow, or other readily understood similar terms.

The functions provided by the controller will now be described relative to the flow diagrams of FIGS. 6, 7, 8, 9 and 10 and in conjunction with the following parameters:

TS: hot water supply temperature
TR: return water temperature
TF: cold water inlet migration zone temperature
TA: recirculation loop ambient temperature
TI: heater input water temperature
TO: heater output water temperature
TW: water heater system temperature setting
TRMIN: minimum return water temperature
SP1: setpoint 1
SP2: setpoint 2
SPF: flow setpoint
M: water mass flow rate
Q: recirculating loop heat loss
TRL: average recirculating loop temperature
UA: overall heat transfer coefficient
R: rate of recovery
RT: time interval for recovery
SFT: projected time of day for start of hot water usage
SRT: time of day to start ramp up of hot water supply temperature
RCT: time of day for next recalculation of SP1
RINT: interval between recalculations of SP1

The temperature data TS, TR, TF, TI, TO are respectively provided by the temperature sensors T1, T2, T3, T5, T6 which are located as described above relative to FIGS. 3, 4, 5. Temperature data TA is provided by the temperature sensor T4 which, as discussed above, is located to provide a sensed loop ambient temperature that is generally representative of the ambient temperatures to which the hot water recirculation loop is exposed.

TW is the system water temperature and represents the maximum water temperature to be maintained during peak consumption. TW is set with the built-in heater control, or by input to the water heater controller 100 in OEM installations.

The minimum return temperature TRMIN is determined for each installation by the user, and is the minimum return water temperature which permits sufficient hot water to be available at the furthest usage location on the recirculation loop (i.e., the usage location furthest along the recirculation loop from the heater supply line outlet). For example, sufficient hot water at the furthest usage location might be determined relative to local health codes or the user's needs.

Setpoint SP1 is less than the system water temperature setting TW and establishes a first setback temperature range that is utilized during non-flow of cold water during time intervals historically indicated to be hot water usage periods. The processor and control unit 20 determines setpoint SP1 on system heat loss (discussed further herein) and the minimum return water temperature TRMIN.

Setpoint SP2 is less than setpoint SP1 and establishes a second setback temperature range that is utilized during non-flow time intervals historically indicated to be periods of no hot water usage. Setpoint SP2 is determine for each installation by the user, and defines a minimum temperature range to which the hot water system is allowed to decrease. Typically, the setpoint SP2 can be generally between 80 and 90 degrees F. Lowering of the recirculation loop temperature during non-use intervals within historically indicated non-use periods further reduces heat loss, which is reduced even further by turning off the recirculation or by diverting the return water with the use of an electrically operated diverter valve as discussed previously.

Flow setpoint SPF is a setpoint that is utilized for determining whether the flow temperature TF indicates flow or non-flow conditions. Flow setpoint SPF can be input manually or can be determined by the processor and control unit 20 relative to the sensed return water temperature TR.

The water mass flow rate M is determined by the user and is utilized with the difference between supply temperature and return temperature to calculate heat loss pursuant to the following:

$$Q = M*Cp*dT$$

where Cp is the specific heat of water and dT is the difference between hot water supply temperature and return temperature.

The heat loss Q can also be defined in terms of the overall heat transfer coefficient UA and the difference between the average recirculating loop temperature and the loop ambient temperature TA:

$$Q = UA*(TRL - TA)$$

which permits the overall heat transfer coefficient to be calculated on the basis of the heat loss Q:

$$UA = Q/(TRL - TA)$$

The rate of recovery R, which has dimensions of degrees per unit time, depends on the capability of the water heater system to transfer heat to the water and is determined for each installation by the user, for example empirically or pursuant to the manufacturer's recovery specification.

The time interval for recovery RT is a calculated value indicative of the amount of time required by the water heater system to raise the hot water supply temperature from a first temperature to a second temperature, and is calculated by the controller 100.

The projected time of day for start of hot water usage SFT is calculated by the controller on the basis of historical hot water usage data. The time of day to start ramp-up of hot water supply temperature is calculated by controller 100 and is the time of day when the controller begins to increase the hot water supply temperature in anticipation of the start of a historically indicated hot water usage period. The time of day RCT for the next recalculation of setpoint SP1 defines the time when the setpoint SP1 is recalculated, and is determined by the controller 100 on the basis of the time interval between recalculations RINT which is determined by the user.

Figure 6:
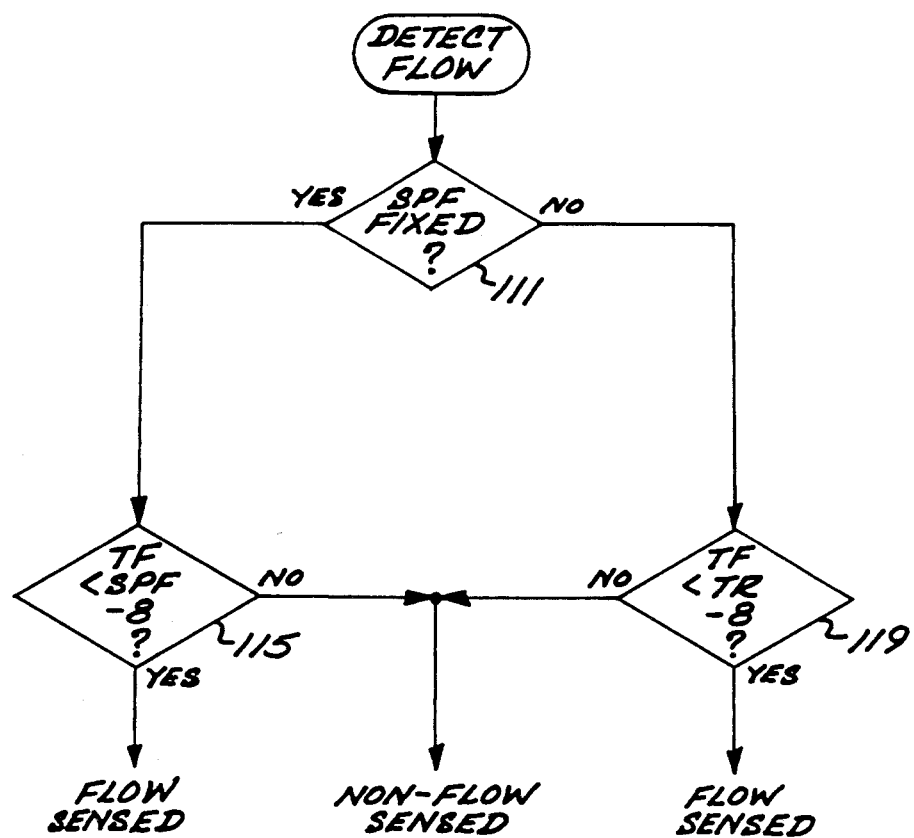
FIGS. 6 through 9 are flow diagrams illustrating the functions utilized by the controller in controlling the controlled water heater system.

The water heater controller 100 controls operation of the water heater relative to the setpoints SP1 and SP2 only when no flow of cold water is detected. When cold water flow is detected, control is based on the system temperature setting TW, for example by turning on control relays CR1, CR2, CR3 to relinquish control to the built-in heater control or by controlling the supply temperature TS relative to TW. Set forth in FIG. 6 is a flow diagram of an illustrative example of a DETECT FLOW process for detecting whether cold water is flowing in the cold water supply line of the water heater system. A determination is made at 111 as to whether flow setpoint SPF has been input as a fixed value. If yes, which indicates that flow setpoint SPF will not be determined relative to the return water temperature, a determination is made at 115 as to whether the migration zone temperature TF is less than flow setpoint SPF less 8 degrees F. If no, the non-flow condition is indicated. If the determination at 115 is yes, TF is less than SPF less 8 degrees, the flow condition is indicated.

If the determination at 111 is no, a determination is made at 119 as to whether the migration zone temperature TF is less than the return water temperature TR less 8 degrees F. If no, the non-flow condition is indicated. If the determination at 119 is yes, TF is less than TR less 8, the flow condition is indicated. Thus, when a fixed value of the flow setpoint SPF is not utilized, the return temperature TR is utilized as the applicable flow setpoint.

Figure 7:
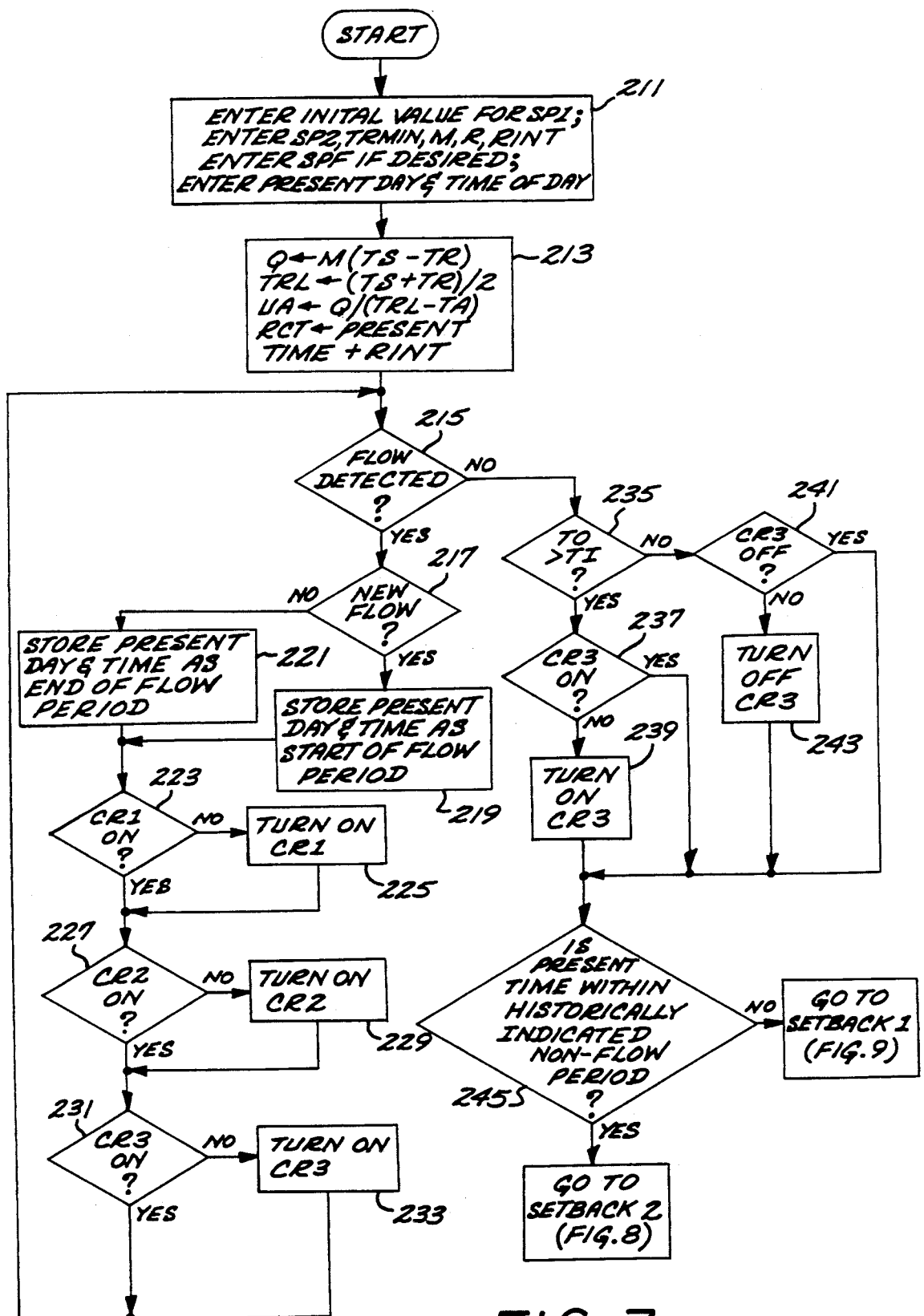
Figure 8:
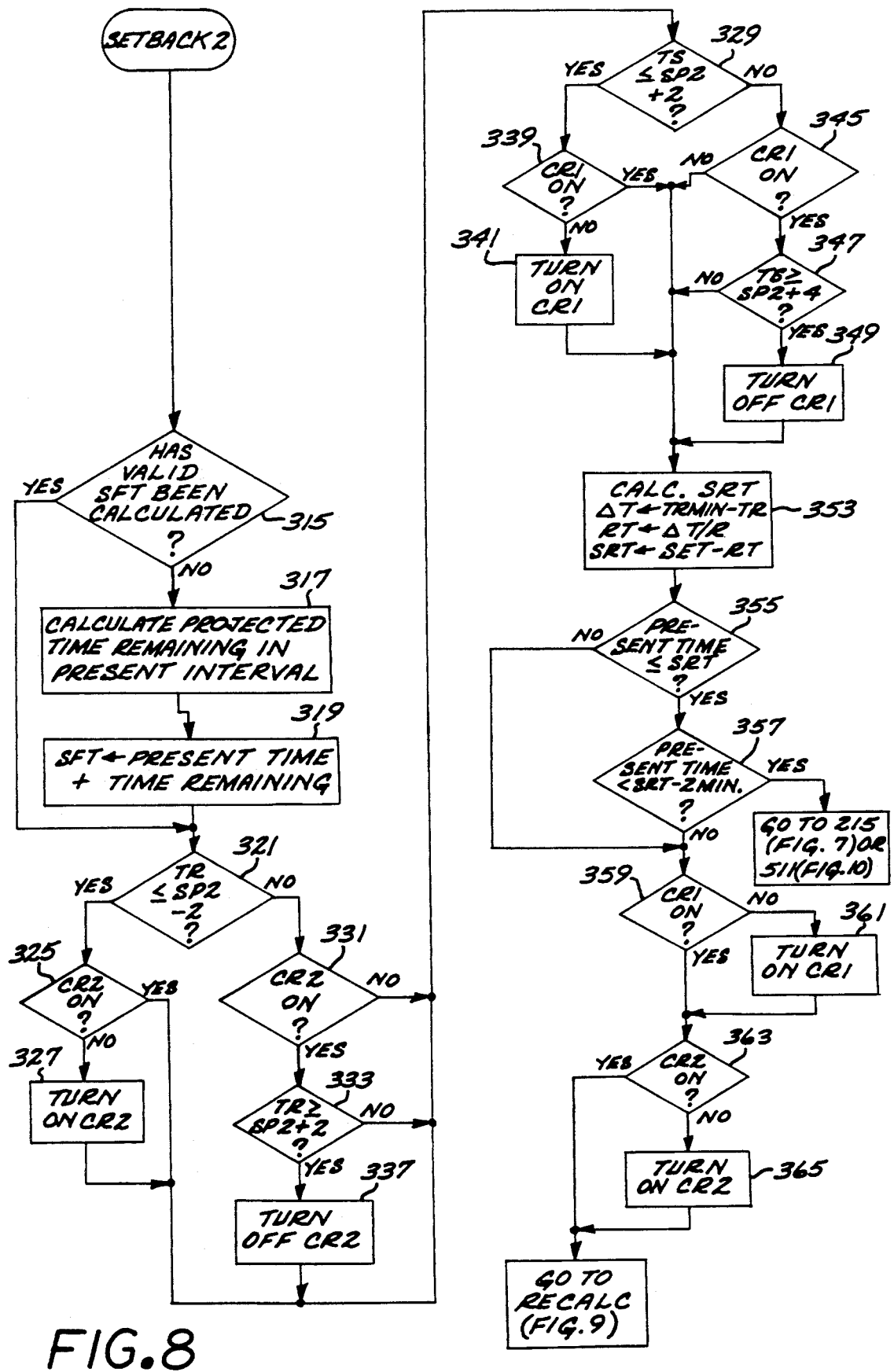
Figure 9:
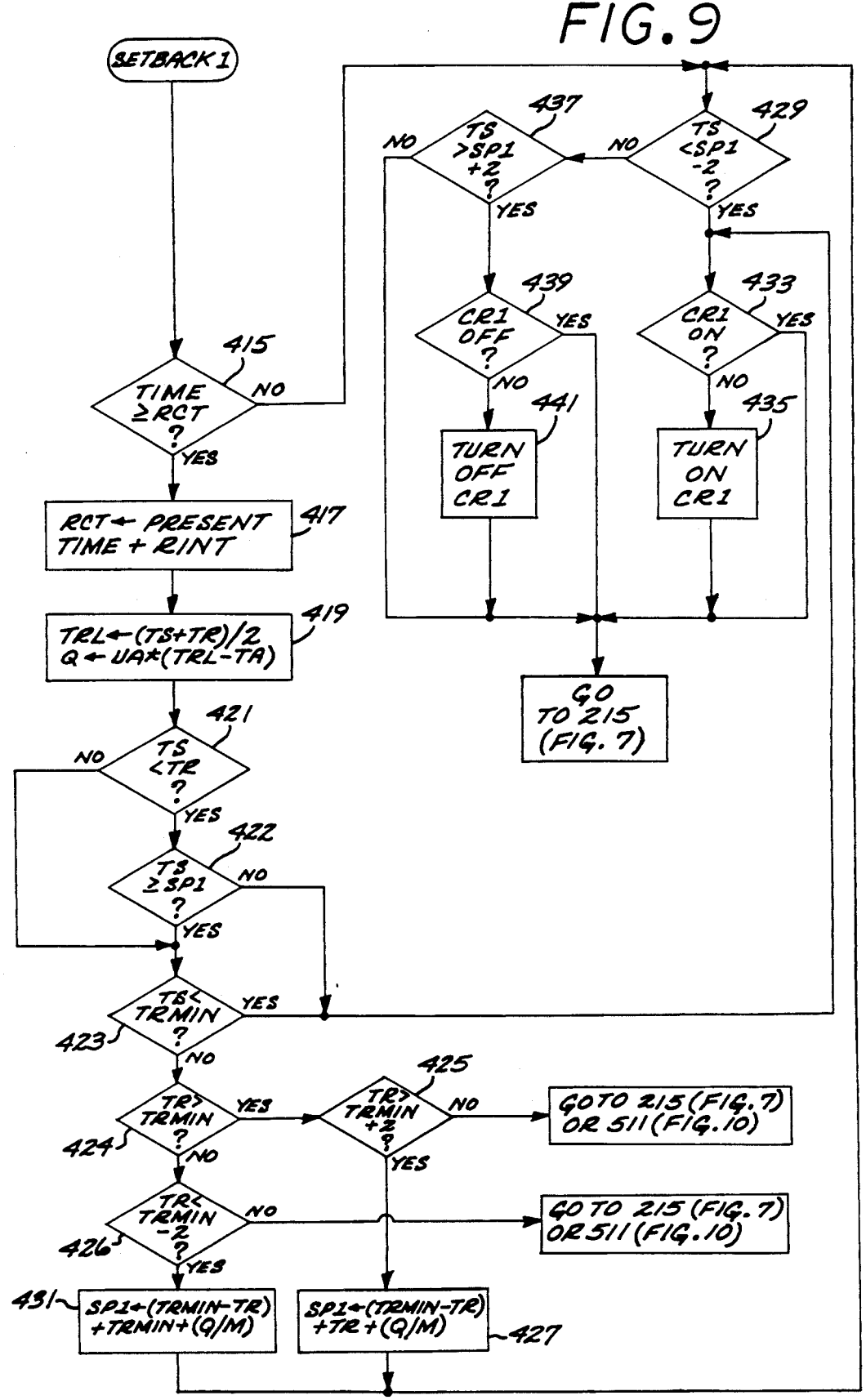

FIG. 7 together with FIGS. 8 and 9 illustrate the functions provided by the water heater controller 100 as a retrofit installation, for example in an installed water heater system or in conjunction with the installation of a water heater system having built-in heater controls. FIG. 10 together with FIGS. 8 and 9 illustrate the functions provided by the water heater controller 100 as an OEM installation. Since the processes of FIGS. 7 and 10 utilized the processes of FIGS. 8 and 9, the latter figures include alternative references to both FIGS. 7 and 10 as to transfers of control.

RETROFIT INSTALLATION

Referring now to FIG. 7, at 211 the water controller system is initialized. The initial value for the setpoint SP1 is entered. Desired values are entered for the minimum return temperature TRMIN, the setpoint SP2, the water mass flow rate M, the recovery rate R, and the time interval RINT between recalculations of the setpoint SP1. If desired, a fixed value for the flow setpoint SPF is entered. The present day of the week and time of day are also entered, and processing by the processor and control unit 20 begins.

It should be appreciated that appropriate controls are provided for achieving a master reset, which for example clears all inputs and stored data. If desired, controls can be provided for achieving a partial reset (which for example allows selected inputs to be changed and preserves stored data). Commands for master reset or partial reset can be communicated via the keyboard 69 or via the communications transmitter/receiver 61.

At 213 initial values are calculated for the recirculating loop heat loss Q, the average recirculating loop temperature TRL, and the overall heat transfer coefficient UA. The heat loss Q is calculated by multiplying the mass flow rate M by the difference between the sensed supply temperature TS and the sensed return water temperature TR. The average loop temperature TRL is one-half the sum of the sensed hot water supply temperature TS and the sensed return water temperature TR. The overall heat transfer coefficient UA is the heat loss Q divided by the difference between the average loop temperature TRL and the sensed loop ambient temperature TA. Also at 213, the time of day RCT for the next recalculation of setpoint 1 is set to the present time plus the recalculation interval RINT.

At 215 at determination is made to whether cold water flow is detected, which can be made pursuant to the functions of the DETECT FLOW process of FIG. 6. If the determination as to flow is yes, a determination is made at 217 as to whether the detected flow is new (i.e., whether non-flow was detected on the immediately prior determination at 215). If yes, the present day and time are stored in memory at 219, and control transfers to 223.

If the determination at 217 is no as to whether the detected flow is new, at 221 the present day and time of day are stored as the end of the flow period, which is continually updated as long as the present flow continues. Thus, when the present flow ceases, the most recently stored day and time of day identify the end of a flow period.

At 223 a determination is made as to whether the control relay CR1 is on. If no, the control relay CR1 is turned on at 225, and control transfers to 227. If the determination at 223 is yes, the control relay CR1 is on, control continues with 227.

At 227 a determination is made as to whether the control relay CR2 is on. If no, the control relay CR2 is turned on at 229, and control transfers to 231. If the determination at 227 is yes, the control relay CR2 is on, control continues with 231.

At 231 a determination is made as to whether the control relay CR3 is on. If no, the control relay CR3 is turned on at 233, and control transfers to 215. If the determination at 231 is yes, the control relay CR3 is on, control transfers to 215.

The control relays CR1, CR2, CR3 remain on so long as flow is detected, which effectively releases control of the water heater system to its built-in control for the duration of a flow condition.

By the foregoing functions, the start and end times of cold water flow are stored for a predetermined number of days, for example 14 to 21 days (i.e., two to three weeks). The historical data of flow periods provides historical data of non-flow periods since at any given point in time the cold water is either flowing or not flowing into the water heater system.

If the determination at 215 is no as to whether flow is detected, a determination is made at 235 as to whether the heater outlet temperature TO is greater than the heater inlet temperature TI. If yes, a determination is made at 237 as to whether the control relay CR3 (heater pump) is on. If no, the control relay CR3 is turned on at 239, and control transfers to 245. If the determination at 237 is yes, the control relay CR3 is on, control transfers to 245.

If the determination at 235 is no as to whether the heater outlet temperature TO is greater than the heater inlet temperature TI, a determination is made at 241 as to whether the control relay CR3 is off. If no, the control relay CR3 is turned off at 243, and control transfers to the 245. If the determination at 241 is yes, the control relay CR3 is off, control transfers to 245.

The foregoing control of the heater pump via the control relay CR3 when non-flow is detected increases the amount of thermal energy that is transferred from the water heater to the heated water, thereby increasing thermal efficiency. Turning off control relay CR3 while no heat can be transferred to the water also reduces heat loss.

At 245 a determination is made as to whether the present time is within a historically indicated non-flow period that is based on the historical flow data of two weeks or three weeks earlier. By way of specific example, the later non-flow start time is utilized with the earlier non-flow end time to define the historically indicated non-flow interval. Thus, for example, if the present day is day 3, and the data for day 3 indicates a non-flow interval from 14:00 to 17:00 one week earlier and a non-flow interval from 14:14 to 16:45 two weeks earlier, the historically indicated non-flow period for use in 245 would be from the interval from 14:14 to 16:45. In other words, a historically indicated non-flow period is defined by the latest non-flow start historical data and the earliest non-flow end historical data.

If the determination at 245 is no as to whether the present time is within a historically indicated non-flow period, control transfers to the SETBACK1 process of FIG. 9.

If the determination at 245 is yes, the present time is within a historically indicated non-flow period as determined above, control transfers to the SETBACK2 process of FIG. 8.

Referring now to the SETBACK process of FIG. 8, a determination is made at 315 as to whether the projected flow start time SFT for the present non-flow interval had been previously calculated. If no, then at 317 the projected time remaining in the present non-flow interval, which is based upon the end-time of the historically indicated non-flow period. A projected start time of flow SFT is calculated at 319 by adding the projected remaining time to the present time of day.

A determination is made at 321 as to whether the return temperature TR is less than the setpoint SP2 less 2 degrees F. If yes, a determination is made at 325 as to whether the control relay CR2 is on. If no, the control relay CR2 is turned on at 327, and control transfers to 329. If the determination at 325 is yes, the control relay CR2 is on, control transfers to 329.

If the determination at 321 is no as to whether the return temperature TR is less than or equal to the setpoint SP2 less 2 degrees, a determination at 331 as to whether the control relay CR2 is on. If no, control transfers to 329. If the determination at 331 is yes, the control relay CR2 is on, a determination is made at 333 as to whether the return temperature TR is greater than or equal to the setpoint SP2 plus 2 degrees F. If no, control transfers to 329. If the determination at 333 is yes, the return temperature TR is greater than or equal to the setpoint SP2 plus 2, the control relay CR2 is turned off at 337, and control transfers to 329.

At 329 a determination is made as to whether the hot water supply temperature TS is less than or equal to the set point SP2 plus 2 degrees F. If yes, a determination is made at 339 as to whether the relay CR1 is on. If no, the control relay CR1 is turned on at 341 and control transfers to 353. If the determination 339 is yes, the relay CR1 is on, control transfers to 353.

If the determination 329 is no as to whether TS is less than or equal to SP2 plus 2 degrees, a determination is made at 345 as to whether the control relay CR1 is on. If no, control transfers to 353. If the determination at 345 is yes, the control relay CR1 is on, a determination is made at 347 as to whether the hot water supply temperature TS is greater than or equal to setpoint SP2 plus 4 degrees F. If no, control transfers to 353. If the determination at 347 is yes, the supply temperature TS is greater than or equal to SP2 plus 4 degrees, the control relay CR1 is turned off at 349, and control transfers to 353.

A ramp-up start time SRT, which is the time of day when the hot water supply temperature will be increased in anticipation of the end of a non-flow interval, is calculated at 353. A temperature difference delta T is calculated by subtracting the sensed return temperature TR from the minimum return temperature TRMIN. The temperature difference delta T is then divided by the rate of recovery R to determine the recovery time interval RT. The time of day to start ramp-up SRT is determined by subtracting the recovery time interval RT from the projected start time of flow SFT calculated previously at 319. Control then transfers to 355.

At 355 a determination is made as to whether the present time is less than or equal to the ramp-up start time SRT. If no, control transfers to 359. If the determination at 355 is yes, the current time is less than or equal to the ramp start up time SRT, a determination is made at 357 as to whether the current time is less than the ramp-up start time SRT less 2 minutes. If yes, control returns to 215 in FIG. 7. If the determination at 357 is no as to whether the present time is less than the ramp-up start time SRT less 2 minutes, a determination is made at 359 as to whether the control relay CR1 is on. If no, the control relay CR1 is turned on at 361 and control transfers to 363. If the determination at 359 is yes, a determination is made at 363 as to whether the control relay CR2 is on. If the determination at 363 is no, the control relay CR2 is turned on at 365 and control transfers to the SETBACK1 process of FIG. 9. If the determination at 363 is yes, control transfers to the SETBACK1 process of FIG. 9.

Referring now to FIG. 9, shown therein is the SETBACK1 process. A determination is made at 415 as to whether the present time is greater than or equal to the time of day for recalculation RCT. If no, control transfers to 429. If the determination at 415 is yes, the time of day for recalculation RCT is updated at 417 by adding the recalculation interval RINT to the present time and assigning the resulting sum to RCT.

At 419 the average recirculating loop temperature TRL is calculated by averaging the supply temperature TS and the return temperature TR. The recirculating loop heat loss Q is calculated by multiplying the difference between TRL and the loop ambient temperature TA by the overall heat transfer coefficient UA.

At 421 a determination is made as to whether the supply temperature TS is less than the return temperature TR. If no, control transfers to 423. If the determination is yes, TS is less than TR, a determination is made at 422 as to whether the supply temperature TS is greater than or equal to set point SP1. If the determination at 422 is no, control transfers to 433. If the determination at 422 is yes, control transfers to 423.

At 423 a determination is made as to whether the supply temperature TS is less than the minimum return temperature TRMIN. If no, control transfers to 424. If the determination at 423 is yes, TS is less than TRMIN, control transfers to 433.

At 424 a determination is made as to whether the return temperature TR is greater than the minimum return temperature input TRMIN. If no, control transfers to 426 for a determination as to whether the return temperature TR is less than the minimum return temperature TRMIN less 2 degrees F. If the determination at 426 is no as to whether TR is less than TRMIN less 2 degrees, control returns to 215 in FIG. 7. Otherwise control transfers to 431 where setpoint SP1 is updated by adding TRMIN and the quotient Q/M to the difference between TRMIN and TR. Control then continues with 429.

If the determination at 424 is yes, TR is greater than TRMIN, a determination is made at 425 as to whether the return temperature TR is greater than the minimum return temperature TRMIN plus 2 degrees F. If the determination at 425 is no, control returns to 215 in FIG. 7. If the determination at 425 is yes, the return temperature TR is greater than the minimum return temperature TRMIN, the setpoint SP1 is updated at 427 by adding TR and the quotient Q/M to the difference between TRMIN and TR. Control then continues with 429.

At 429, a determination is made as to whether the supply temperature TS is less than the setpoint SP1 less 2 degrees F. If yes, a determination is made at 433 as whether the control relay CR1 is on. If yes, control transfers to 215 of FIG. 7. If the determination at 433 is no, the control relay CR1 is turned on at 435, and then control transfers to 215 of FIG. 7.

If the determination at 429 is no, a determination is made at 437 as to whether the supply temperature TS is greater than the setpoint SP1 plus 2 degrees F. If no, controls transfers to 215 of FIG. 7. If the determination at 437 is yes, a determination is made at 439 as to whether the control relay CR1 is off. If no, the control relay CR1 is turned off at 441, and control transfers to 215 in FIG. 7. If the determination at 439 is yes the control relay CR1 is off, control transfers to 215 in FIG. 7.

OPERATION PURSUANT TO INITIAL INSTALLATION

When the water heater controller 100 is initially installed, there will be no historical data. Preferably, the processor and control unit 20 is configured to determine that there are historically indicated hot water use and non-use periods only if there is sufficient historical use and non-use data, for example two weeks of data. Thus, the determination at 245 (FIG. 7) will be no if the historical hot water use and non-use data is insufficient, and only setpoint SP1 will be applicable so long as the historical data is insufficient.

OEM INSTALLATION

As mentioned earlier, the water heater controller 100 of the invention can be installed as part of an original water heater system, in which case the processor and control unit 20 would provide additional functions typically associated with a built-in heater control. For example, the processor and control unit 20 would provide control of the water temperature setting TW, and would also be responsive to the manual reset monitor relay MR2, the water monitor relay MR3, and the temperature monitor relay MR3 shown in FIG. 1, which would be connected to appropriate water heater relays or transducers as is well known in the art. By way of specific example, the manual reset monitor relay would be open when the manual reset relay is open (i.e., system off), the water monitor relay would be open when the heater water is insufficient (e.g., low level or low pressure), and the temperature monitor relay would be open when the heater water temperature exceeded a set limit.

Figure 10A:
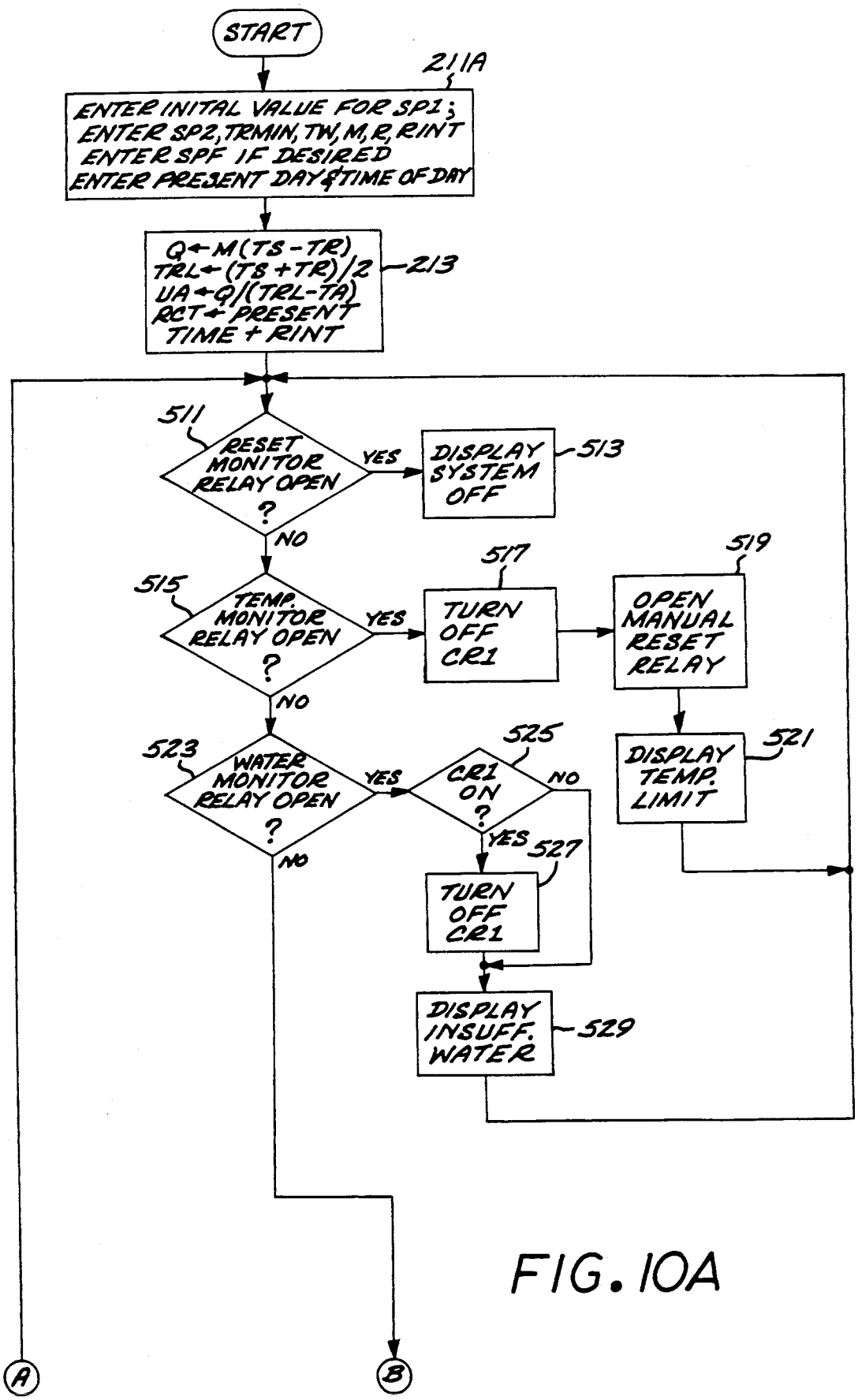
FIGS. 10A and 10B show a flow diagram illustrating the functions provided by the water heater controller in an OEM installation.
Figure 10B:
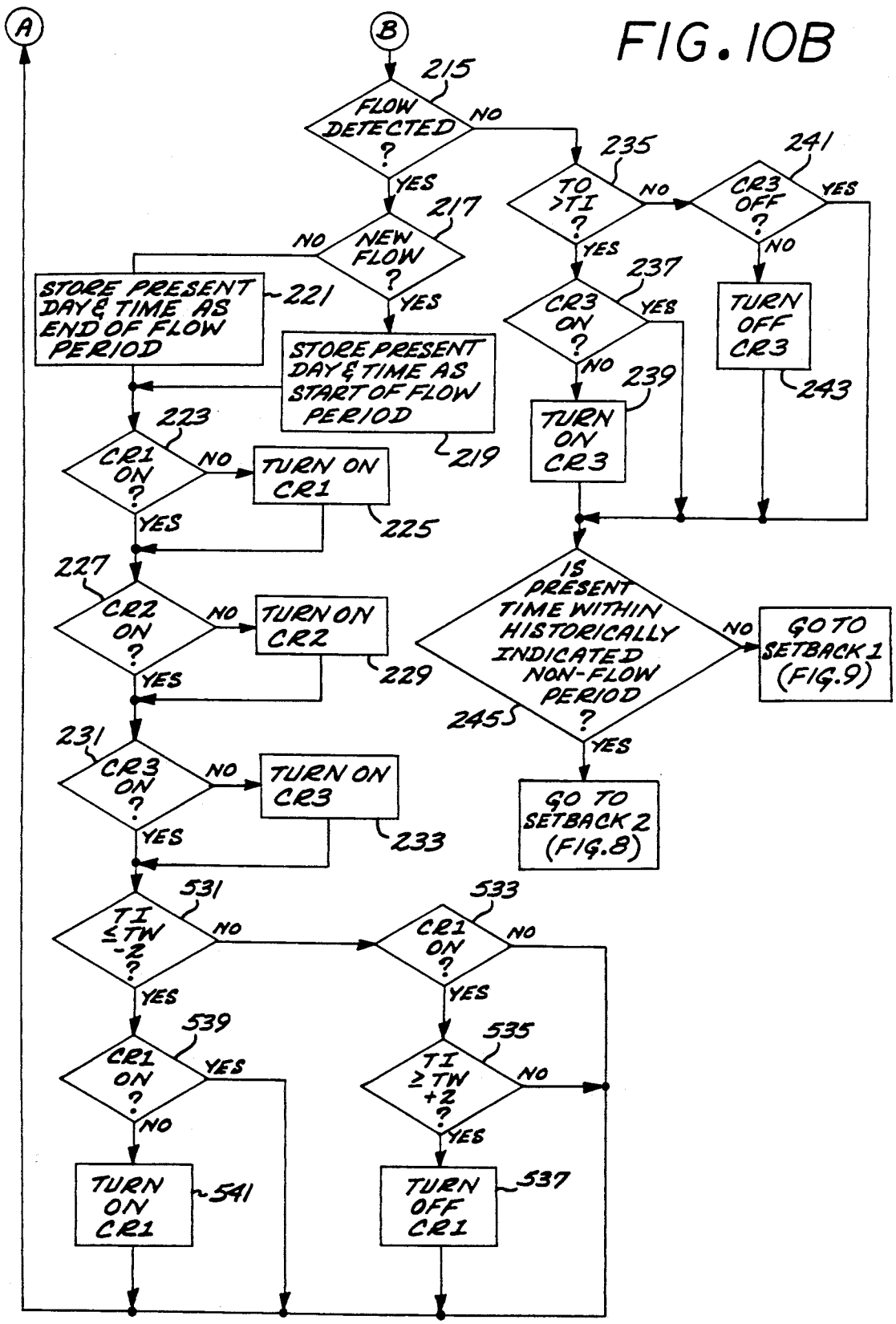

Referring now to FIGS 10A and 10B, illustrated therein is a process for OEM installations which would be utilized in place of the process of FIG. 7. The process of FIGS. 10A and 10B utilizes the SETBACK2 and SETBACK1 processes of FIGS. 8 and 9, except that transfers indicated on FIGS. 8 and 9 to 215 of FIG. 7 would be made to 511 of FIG. 10A. The process of FIGS. 10A and 10B is similar to that of FIG. 7, and generally adds functions to those of the process of FIG. 7. The functions that are shared with the process of FIG. 7 have the same reference numerals, and will not be described again, except as necessary to the understanding of the OEM process of FIGS. 10A and 10B.

At 211A, input values are entered as at 211 in FIG. 7 as described above, with the additional input of the system water temperature setting TW which will be used by the water heater controller 100 as the maximum hot water supply temperature to be maintained during peak consumption. The functions provided at 213 are the same as provided at 213 in FIG. 7.

At 511 a determination is made as to whether the manual reset relay of the water heater system is open. If yes, a system off indicator is displayed at 513 and processing stops.

If the determination at 511 is no as to whether the reset relay is open, a determination is made at 515 as to whether the temperature monitor relay is open. If yes, indicating that a temperature limit has been met or exceeded, the control relay is turned off at 517, the reset relay is opened at 519, a temperature limit indicator is displayed at 521, and control returns to 511.

If the determination at 515 is no as to whether the temperature monitor relay is open, a determination is made at 523 as to whether there is sufficient water in the heater (e.g., level or pressure). If yes, a determination is made at 525 as to whether the control relay CR1 is on. If the control relay CR1 is on, it is turned off at 527, an insufficient water indicator is displayed at 529, an control returns to 511.

In the foregoing, an open manual reset relay or a temperature limit exceeded condition causes processing to stop. An insufficient water condition will continue checking for that condition until is rectified.

If the determination at 523 is no as to whether the water monitor relay is closed, processing continues with 215 and the blocks that follow as described above relative to FIG. 7, except that after a yes determination at 231 or after 233, processing continues with 531.

At 531, a determination is made as to whether the heater inlet temperature TI is less than or equal to the water temperature setting TW less 2 degrees F. If no, a determination is made at 533 as to whether the control relay CR1 is on. If the control relay is not on, control transfers to 511.

If the determination at 533 is yes, the control relay CR1 is on, a determination is made at 535 as to whether the heater inlet temperature TI is greater than or equal to the water temperature setting TW plus 2 degrees F. If no, control returns to 511. If the determination at 535 is yes, TI is greater than or equal to TW plus 2 degrees, the control relay CR1 is turned off at 537, and control transfers to 511.

If the determination at 531 is yes, the heater inlet temperature is less than or equal to the water temperature setting TW less 2 degrees F, a determination is made at 539 as to whether the control relay CR1 is on. If it is on, control transfers to 511. If the control relay CR1 is not on, it is turned on at 541, and control transfers to 511.

Upon initial installation of a water heater system having an OEM water heater controller 100, the same considerations apply as to the sufficiency of historical hot water use and non-use data. Only the setpoint SP1 will be applicable while the historical data is insufficient, for example for the first week or two after installation.

For non-recirculating systems, the water heater controller 100 would be configured without the return temperature sensor T2, the loop ambient temperature sensor T4, the heater input water temperature sensor T5, and the heater output water temperature sensor T6. Also, the setpoint SP1 would be fixed, and the minimum return temperature TRMIN would not be used. The processes of FIGS. 7 through 10 would be configured without the functions associated with the omitted temperature sensors, the functions associated with recalculating setpoint SP1 which utilized TRMIN.

Simplifications can be made to the above described water heater controller 100 which would maintain some of the advantages provided by the full controller system. For example, a fixed setpoint SP1 could be utilized, in which case the loop ambient temperature sensor T4 would not be utilized. Also, the recalculation of setpoint SP1 would not be utilized, and SETBACK1 would essentially monitor the supply temperature TS.

Further, the water temperature ramp-up function could be omitted, in which case the projected start of flow and the ramp-up start time would not be calculated.

Preset hot water non-use periods could be utilized instead of historically indicated non-use periods. Such preset non-use periods could be determined from an analysis of historical data.

Preset water heater off periods could be utilized, in which case the control relays CR1, CR2, and CR3, if appropriate would be turned off during such preset off intervals. Only the sensing of hot water use would cause water to be heated.

As another example of simplification, the control relays CR2 and CR3 would be omitted, in which case the recirculation pump would always be on, and any heater pump would be controlled by the built-in heater control.

Different setpoints could be utilized relative to the supply temperature and the return temperature.

It should be appreciated that the foregoing simplifications can be made individually or in combinations as appropriate.

The foregoing described water heater controller provides features which address system heat loss, overall thermal efficiency, and the required availability of hot water.

During intervals of no hot water usage, the controller permits the hot water supply temperature to decrease to certain setback temperature ranges to reduce heat loss while maintaining the availability of hot water. The applicable setback temperature range depends on hot water usage history. When hot water is being used, the hot water supply temperature is permitted to increase to a predetermined maximum temperature range which represents the temperature range the water heater system is to maintain during peak hot water consumption. The actual hot water supply temperature will therefore depend on actual usage since water temperature is permitted to decrease during periods of non-usage. Thus, relatively low demand will result in a lower hot water supply temperature than relatively high demand, which results from the temperature control promptly provided by the controller whenever hot water usage stops.

More particularly as to setback temperature ranges, during non-use intervals within historically indicated hot water usage periods, the controller provides for a hot water supply temperature that is within a first setback temperature range which is lower than the predetermined water heater maximum temperature.

During non-use intervals within historically indicated non-usage periods, the controller allows the hot water supply temperature to decrease to be within a second setback temperature range which is less than the first setback temperature range, and the start of the next historically indicated usage period is continually anticipated so as to control the hot water supply temperature to be within the first setback temperature range at the start of the next historically indicated usage period.

Taking the example of a recirculating system, during time intervals within historically indicated hot water usage periods, the first setback temperature range is controlled to be sufficiently high so as to provide the furthest point of usage with sufficient hot water. Specifically, the setpoint SP1, which determines the first setback temperature range, is set by the controller as a function of the minimum return water temperature, the sensed supply temperature, the sensed return temperature, the sensed loop ambient temperature, the water mass flow rate, and the calculated heat transfer coefficient.

Further with the recirculating system example, the second setback temperature range, utilized during non-use intervals within historically indicated non-usage periods intervals, is selected by the user so as to further reduce heat loss and to maintain the recirculating loop sufficiently warm for sufficiently fast response that avoids excessive time for increasing the hot water supply temperature to the minimum temperature defined by the first setback temperature. While permitting the hot water supply temperature to decrease below the first setback temperature, the controller continually calculates the time of day when temperature ramp-up should begin in order to bring the hot water supply temperature to the first setback temperature by the start of the next anticipated start of hot water usage. When the present time and the ramp-up start time are sufficiently close, heating commences to increase the temperature of the hot water supply.

Selectively controlling the recirculation pump to be off reduces recirculation heat loss, and also reduces the heat loss of water in the storage tank, if there is one.

The use of an electrically operated diverter valve to bypass a heater or storage tank during non-use intervals within historically indicated non-usage periods further reduces heat loss while maintaining a supply of hot water ready for use. Taking for example a water heater system with a separate storage tank, bypassing the storage tank reduces the amount of water subject to heat loss in the recirculation loop, and advantageously maintains a large amount of water in the storage tank which typically would have very low heat loss. The use of a diverter valve to selectively bypass an instantaneous heater prevents heat loss in the heater itself.

The reduction in heat loss achieved by use of a diverter valve is advantageously utilized in problem water heater systems, such as those of insufficient capacity for their installations. Such lack of capacity is commonly compensated by use of higher maximum temperatures (at the sacrifice of equipment longevity and reliability). With a diverter valve, the hot water in the storage tank is readily maintained at a higher temperature by the efficiency of the tank, while the recirculation loop heat loss is reduced.

The disclosed water heater controller further provides for increased system efficiency by preventing heater short cycling, which occurs when a heater is turned on often for short periods of time, by increasing the temperature of all of the water in the system and by the use of respective setback temperature ranges about the setpoints. In other words, the heater is turned on when the applicable water temperature (supply or return) reaches a specified temperature below the applicable setpoint and stays on until the water temperature reaches a specified temperature above the applicable setpoint.

The avoidance of short cycling is particularly significant in modulating heaters, which commonly operate at low fire about 90% of the time. Heater efficiency at low fire is typically at its lowest, often 30 to 40%, as distinguished from 74 to 80% at high fire. The invention substantially eliminates the need for low fire as a result of the setback ranges about the setpoints and the capability to monitor and respond to the system needs.

For water heater systems having heater pumps, further heater efficiency is achieved by controlling the heater pump to circulate water through the heater so long as thermal energy can be positively transferred to the water.

From the foregoing, it should be appreciated that the disclosed system increases overall thermal efficiency by reducing heat loss and by increasing system operating efficiency, while also providing for fast response to hot water demand.

Although the foregoing has been a description and illustration of specific embodiments of the invention, various modifications and changes thereto can be made by persons skilled in the art without departing from the scope and spirit of the invention as defined by the following claims.

What is claimed is:

1. A controller for a hot water heater system having a heater for heating water, a hot water outlet for supplying hot water, a cold water inlet for receiving cold water, and a return line for returning non-used supplied hot water for reheating, the controller comprising:

recirculating means for circulating the supplied hot water to points of usage and back to the heater via the return line;

means coupled to the hot water outlet for sensing the temperature of the hot water supply and providing hot water supply temperature data;

means coupled to the return line for sensing the temperature of the return water and providing return water temperature data;

means for sensing use and non-use of hot water;

means for storing historical data indicative of time periods of hot water use and non-use; and control means responsive to said hot water supply temperature sensing means, said return temperature sensing means, and said use sensing means for (a) calculating a first setback temperature, (b) controlling the heater to permit the hot water supply temperature to decease to and remain within a first supply setback temperature range based on said calculated setback temperature during sensed non-use that is within a historically indicated hot water use period based on said historical use and non-use data, (c) selectively controlling the heater and said recirculating means to permit the hot water supply temperature to decrease to and remain within a second supply setback temperature range based on a second setback temperature that is lower than said first setback temperature and to permit the return water temperature to decrease to within a return setback temperature range based on said second setback temperature during non-use that occurs within a historically indicate non-use period based on said historical non-use data, (d) controlling the water heater and said recirculating means during sensed use of hot water so that the hot water supply temperature is controlled relative to a predetermined maximum temperature which is greater than said first setback temperature.

2. The controller of claim 1 wherein said first setback temperature is calculated as a function of the heat loss of the hot water heater system and a predetermined minimum return water temperature.

3. The controller of claim 2 further including means for sensing an ambient temperature representative of the ambient temperatures to which the recirculation loop is exposed and providing ambient temperature data, and wherein the heat loss of the hot water system is calculated as a function of the loop ambient temperature sensed by said ambient temperature sensing means.

4. The controller of claim 1 wherein said sensing means comprises flow sensing means for sensing the flow of cold water into the water heater system.

5. The controller of claim 4 wherein said flow sensing means comprises a temperature sensor located at the hot water migration zone of the cold water inlet.

6. The controller of claim 1 wherein said control means calculates a projected time of day for the start of hot water usage and controls said hot water supply temperature so as to be at about said first setback temperature at said projected time of start of hot water usage.

7. The controller of claim 6 wherein said control means determines a temperature ramp-up start time when heating of water is to start so as to control said hot water supply temperature to be at about said first setback temperature at said projected time of start of hot water usage.

8. The controller of claim 7 wherein said ramp-up start time is determined as a function of the difference between a predetermined minimum return water temperature and the sensed return water temperature.

9. The controller of claim 7 wherein said recirculating means includes a recirculation pump controlled by said control means.

10. The controller of claim 1 wherein said recirculating means includes diverting means controlled by said control means for selectively diverting return water directly into the hot water outlet.

11. The controller of claim 10 wherein said diverting means comprises an electrically operated diverter valve.

12. The controller of claim 10 wherein said recirculating means further includes a recirculation pump located upstream of said diverting means.

13. The controller of claim 1 wherein said second supply setback temperature range comprises the range between the second setback temperature and a higher temperature, and wherein said return setback temperature range comprises the range between the second setback temperature and a lower temperature.

14. The controller of claim 1 wherein said historical data comprises manually entered data.

15. The controller of claim 1 wherein said historical data comprises historical use and non-use data.

16. A controller for a hot water heater system having a heater for heating water, a heater pump, a hot water outlet for supplying hot water, a cold water inlet for receiving cold water, and a return line for returning non-used supplied hot water for reheating, the controller comprising:

recirculating means for circulating the supplied hot water back to the heater via the return line;

means coupled to the hot water outlet for sensing the temperature of the hot water supply and providing hot water supply temperature data;

means coupled to the return line for sensing the temperature of the return water and providing return water temperature data;

means for sensing the temperature of the input water to the heater;

means for sensing the temperature of the output water to the heater;

means for sensing use and non-use of hot water;

means for storing historical data indicative of time periods of hot water use and non-use; and control means responsive to said hot water supply temperature sensing means, said return temperature sensing means, and said use sensing means for (a) calculating a first setback temperature, (b) controlling the heater to permit the hot water supply temperature to decease to and remain within a first supply setback temperature range based on said calculated setback temperature during sensed non-use that is within a historically indicated hot water use period based on said historical use and non-use data, (c) selectively controlling the heater and said recirculating means to permit the hot water supply temperature to decrease to and remain within a second supply setback temperature range based on a second setback temperature that is lower than said first setback temperature and to permit the return water temperature to decrease to within a return setback temperature during non-use that occurs within a historically indicated non-use period based on said historical non-use data, (d) turning on the heater pump when said heater output water temperature is greater than said heater input water temperature, and (e) controlling the water heater and said recirculating means during sensed use of hot water so that the hot water supply temperature is controlled relative to a predetermined maximum temperature which is greater than said first setback temperature.

17. The controller of claim 16 wherein said first setback temperature is calculated as a function of the heat loss of the hot water heater system and a predetermined minimum return water temperature.

18. The controller of claim 17 further including means for sensing an ambient temperature representative of the ambient temperatures to which the recirculation loop is exposed and providing ambient temperature data, and wherein the heat loss of the hot water system is calculated as a function of the loop ambient temperature sensed by said ambient temperature sensing means.

19. The controller of claim 16 wherein said sensing means comprises flow sensing means for sensing the flow of cold water into the water heater system.

20. The controller of claim 19 wherein said flow sensing means comprises a temperature sensor located at the hot water migration zone of the cold water inlet.

21. The controller of claim 16 wherein said control means calculates a projected time of day for the start of hot water usage and controls said hot water supply temperature so as to be at about said first setback temperature at said projected time of start of hot water usage.

22. The controller of claim 21 wherein said control means determines a temperature ramp-up start time when heating of water is to start so as to control said hot water supply temperature to be at about said first setback temperature at said projected time of start of hot water usage.

23. The controller of claim 22 wherein said ramp-up start time is determined as a function of the difference between a predetermined minimum return water temperature and the sensed return water temperature.

24. The controller of claim 16 wherein said recirculating means includes a recirculation pump controlled by said control means.

25. The controller of claim 16 wherein said recirculating means includes diverting means controlled by said control means for selectively diverting return water directly into the hot water outlet.

26. The controller of claim 25 wherein said diverting means comprises an electrically operated diverter valve.

27. The controller of claim 25 wherein said recirculating means further includes a recirculation pump located upstream of said diverting means.

28. The controller of claim 16 wherein said second supply setback temperature range comprises the range between the second setback temperature and a higher temperature, and wherein said return setback temperature range comprises the range between the second setback temperature and a lower temperature.

29. The controller of claim 16 wherein said historical data comprises manually entered data.

30. The controller of claim 16 wherein said historical data comprises historical use and non-use data.

31. A controller for a hot water heater system having a heater for heating water, a hot water outlet for supplying hot water, and a cold water inlet for receiving cold water, the controller comprising:

means coupled to the hot water outlet for sensing the temperature of the hot water supply and providing hot water supply temperature data;

means for sensing use and non-use of hot water; and control means responsive to said hot water supply temperature sensing means and said use sensing means for (a) controlling the heater to permit the hot water supply temperature to decrease to and remain within a first supply setback temperature range defined by a first setback temperature during sensed non-use that is within a predetermined hot water use period, (b) controlling the heater to permit the hot water supply temperature to decrease to and remain within a second supply setback temperature range defined by a second setback temperature during sensed non-use that is within a predetermined heater off periods, and (c) controlling the water heater during sensed use of hot water so that the hot water supply temperature is controlled relative to a predetermined maximum temperature which is greater than said first setback temperature.

32. The controller of claim 31 wherein said sensing means comprises flow sensing means for sensing the flow of cold water into the water heater system.

33. The controller of claim 32 wherein said flow sensing means comprises a temperature sensor located at the hot water migration zone of the cold water inlet.

34. The controller of claim 31 wherein said first setback temperature is a fixed value.

35. A controller for a hot water heater system having a heater for heating water, a hot water outlet for supplying hot water, a cold water inlet for receiving cold water, and a return line for returning non-used supplied hot water for reheating, the controller comprising:

recirculating means for circulating the supplied hot water to points of usage and back to the heater via the return line;

means coupled to the hot water outlet for sensing the temperature of the hot water supply and providing hot water supply temperature data;

means coupled to the return line for sensing the temperature of the return water and providing return water temperature data;

means for sensing use and non-use of hot water;

means for storing historical data indicative of time periods of hot water use and non-use; and control means responsive to said hot water supply temperature sensing means, said return temperature sensing means, and said use sensing means for (a) controlling the heater to permit the hot water supply temperature to decease to and remain within a first supply setback temperature range based on a first supply setback temperature during sensed non-use that is within a historically indicated hot water use period based on said historical use and non-use data, (c) selectively controlling the heater and said recirculating means to permit the hot water supply temperature to decrease to and remain within a second supply setback temperature range based on a second setback temperature that is lower than said first setback temperature and to permit the return water temperature to decrease to within a return setback temperature range based on said second setback temperature during non-use that occurs within a historically indicated non-use period based on said historical non-use data, (d)

controlling the water heater and said recirculating means during sensed use of hot water so that the hot water supply temperature is controlled relative to a predetermined maximum temperature which is greater than said first setback temperature.

36. The controller of claim 35 wherein said sensing means comprises flow sensing means for sensing the flow of cold water into the water heater system.

37. The controller of claim 36 wherein said flow sensing means comprises a temperature sensor located at the hot water migration zone of the cold water inlet.

38. The controller of claim 35 wherein said control means calculates a projected time of day for the start of hot water usage and controls said hot water supply temperature so as to be at about said first setback temperature at said projected time of start of hot water usage.

39. The controller of claim 38 wherein said control means determines a temperature ramp-up start time when heating of water is to start so as to control said hot water supply temperature to be at about said first setback temperature at said projected time of start of hot water usage.

40. The controller of claim 39 wherein said ramp-up start time is determined as a function of the difference between a predetermined minimum return water temperature and the sensed return water temperature.

41. The controller of claim 35 wherein said recirculating means includes a recirculation pump controlled by said control means.

42. The controller of claim 35 wherein said recirculating means includes diverting means controlled by said control means for selectively diverting return water directly into the hot water outlet.

43. The controller of claim 42 wherein said diverting means comprises an electrically operated diverter valve.

44. The controller of claim 42 wherein said recirculating means further includes a recirculation pump located upstream of said diverting means.

45. The controller of claim 35 wherein said second supply setback temperature range comprises the range between the second setback temperature and a higher temperature, and wherein said return setback temperature range comprises the range between the second setback temperature and a lower temperature.

46. The controller of claim 35 wherein said historical data comprises manually entered data.

47. The controller of claim 35 wherein said historical data comprises historical use and non-use data.

48. A controller for a hot water heater system having a heater for heating water, a heater pump, a hot water outlet for supplying hot water, a cold water inlet for receiving cold water, and a return line for returning non-used supplied hot water for reheating, the controller comprising:

recirculating means for circulating the supplied hot water back to the heater via the return line;
means coupled to the hot water outlet for sensing the temperature of the hot water supply and providing hot water supply temperature data;
means coupled to the return line for sensing the temperature of the return water and providing return water temperature data;
means for sensing the temperature of the input water to the heater;
means for sensing the temperature of the output water to the heater;
means for sensing use and non-use of hot water;
means for storing historical data indicative of time periods of hot water use and non-use; and
control means responsive to said hot water supply temperature sensing means, said return temperature sensing means, and said use sensing means for (a) controlling the heater to permit the hot water supply temperature to decease to and remain within a first supply setback temperature range based on a first supply setback temperature during sensed non-use that is within a historically indicated hot water use period based on said historical use and non-use data, (c) selectively controlling the heater and said recirculating means to permit the hot water supply temperature to decrease to and remain within a second supply setback temperature range based on a second setback temperature that is lower than said first setback temperature and to permit the return water temperature to decrease to within a return setback temperature range based on said second setback temperature during non-use that occurs within a historically indicated non-use period based on said historical non-use data, (d) turning on the heater pump when said heater output water temperature is greater than said heater input water temperature, and (e) controlling the water heater and said recirculating means during sensed use of hot water so that the hot water supply temperature is controlled relative to a predetermined maximum temperature which is greater than said first setback temperature.

49. The controller of claim 48 wherein said sensing means comprises flow sensing means for sensing the flow of cold water into the water heater system.

50. The controller of claim 49 wherein said flow sensing means comprises a temperature sensor located at the hot water migration zone of the cold water inlet.

51. The controller of claim 48 wherein said control means calculates a projected time of day for the start of hot water usage and controls said hot water supply temperature so as to be at about said first setback temperature at said projected time of start of hot water usage.

52. The controller of claim 51 wherein said control means determines a temperature ramp-up start time when heating of water is to start so as to control said hot water supply temperature to be at about said first setback temperature at said projected time of start of hot water usage.

53. The controller of claim 52 wherein said ramp-up start time is determined as a function of the difference between a predetermined minimum return water temperature and the sensed return water temperature.

54. The controller of claim 48 wherein said recirculating means includes a recirculation pump controlled by said control means.

55. The controller of claim 48 wherein said recirculating means includes diverting means controlled by said control means for selectively diverting return water directly into the hot water outlet.

56. The controller of claim 55 wherein said diverting means comprises an electrically operated diverter valve.

57. The controller of claim 55 wherein said recirculating means further includes a recirculation pump located upstream of said diverting means.

58. The controller of claim 48 wherein said second supply setback temperature range comprises the range between the second setback temperature and a higher temperature, and wherein said return setback temperature range comprises the range between the second setback temperature and a lower temperature.

59. The controller of claim 48 wherein said historical data comprises manually entered data.

60. The controller of claim 48 wherein said historical data comprises historical use and non-use data.

* * * * *